United States Patent
Bowe et al.

(10) Patent No.: US 7,637,995 B2
(45) Date of Patent: Dec. 29, 2009

(54) COMPOSITION FOR FORMING A COMPOSITE MATERIAL

(75) Inventors: Michael Damian Bowe, Doylestown, PA (US); William Ivor Stone, Ludlow (GB)

(73) Assignee: Rohm and Haas Company, Philadelphia, PA (US)

( * ) Notice: Subject to any disclaimer, the term of this patent is extended or adjusted under 35 U.S.C. 154(b) by 628 days.

(21) Appl. No.: 11/211,223

(22) Filed: Aug. 25, 2005

(65) Prior Publication Data

US 2006/0042519 A1 Mar. 2, 2006

Related U.S. Application Data

(60) Provisional application No. 60/604,490, filed on Aug. 25, 2004.

(51) Int. Cl.
*C04B 11/00* (2006.01)
(52) U.S. Cl. .................. 106/772; 106/775; 106/778
(58) Field of Classification Search .......... 106/772, 106/775, 778
See application file for complete search history.

(56) References Cited

U.S. PATENT DOCUMENTS

| 4,157,264 A | 6/1979 | Kennedy-Skipton |
| 4,325,856 A | 4/1982 | Ishikawa et al. |
| 4,654,397 A | 3/1987 | Mueller-Mall et al. |
| 4,661,161 A | 4/1987 | Jakacki et al. |
| 4,814,373 A | 3/1989 | Frankel et al. |
| 5,534,059 A | 7/1996 | Immordino, Jr. |
| 5,746,822 A | 5/1998 | Espinoza et al. |
| 6,335,099 B1 | 1/2002 | Higuchi et al. |
| 6,355,099 B1 * | 3/2002 | Immordino et al. |
| 6,566,434 B1 | 5/2003 | Mayer et al. |
| 7,150,787 B2 * | 12/2006 | Clamen et al. |
| 2003/0105202 A1 * | 6/2003 | Stone |
| 2004/0055511 A1 | 3/2004 | Clamen et al. |

FOREIGN PATENT DOCUMENTS

| EP | 1186577 | 3/2002 |
| EP | 1 403 227 A1 | 3/2004 |

* cited by examiner

*Primary Examiner*—Paul Marcantoni
(74) *Attorney, Agent, or Firm*—Cantor Colburn LLP; Kim R Jessum

(57) ABSTRACT

A composition and method for forming a composite material comprising a mixture of component A and component B, component A comprising gypsum and an inhibitor; and component B comprising an accelerator, wherein at least one of component A and component B further comprises a polymer binder having a $T_g$ of below −23° C. or wherein the Shore D hardness of the composite material when cured is less than 70; the method comprising providing a first slurry mixture of component A and a second slurry mixture of component B and blending the first slurry mixture and the second slurry mixture to form a soft composite using a weight ratio of from 10:1 to 1:2.

20 Claims, No Drawings

COMPOSITION FOR FORMING A COMPOSITE MATERIAL

CROSS REFERENCE TO RELATED PATENT APPLICATIONS

This is a non-provisional application of prior pending U.S. Provisional Application No. 60/604,490 filed Aug. 25, 2004.

In the field of industrial tooling and prototyping, gypsum plasters are well known materials for making models and molds. Calcium sulfate hemihydrate plaster is safe and simple to use, and oversized models made of gypsum can be CNC machined to accurate prototypes. CNC is defined as Computer Numerically Controlled, and refers specifically to the computer control of machine tools for the purpose of manufacturing complex parts. However, among gypsum's disadvantages is the handling of dusty powders at the stage of mixing plaster with water. Furthermore, simple plasters generate large amounts of fine dust when they are machined, which can be an irritant to workers as well as interfere with the optics of CNC machines. Set gypsum is often brittle and thus prone to cracking or chipping during the handling required to make a mold from the machined model.

One class of machinable media are epoxy pastes, such as those sold by Huntsman Advanced Materials (East Lansing, Mich.) under the RenPaste™ name, as well as SC 165 manufactured by Axson (Eaton Rapids, Mich.). These pastes are routinely applied over modeling boards composed of polyurethane or expanded polystyrene (EPS) foam. After the pastes cure, they can be CNC machined. However, the epoxy component can have toxicity, are slow to apply, and are expensive.

Some polymer-modified gypsums are also known as machinable media. For example, U.S. Pat. No. 5,534,059 (Immordino) describes mixtures comprising plaster, a starch and a water-redispersible powder polymer. The polymer additive enhances strength and reduces dust. This mixture is a powder that must be mixed with water before casting and curing, but upon machining the cured object, less dust is produced as compared to simple plasters.

U.S. Pat. No. 6,355,099 (Immordino and Kaligian) describes a machinable composition of plaster, a water dispersible internal lubricating binder, and an adhesive binder. The lubricating polymer in this patent preferably has a glass transition temperature, or $T_g$, above room temperature. The composition may be stored as a powder, or as an aqueous slurry which is then mixed with an accelerator immediately prior to use.

United States Gypsum (Chicago, Ill.) manufactures a polymer-modified gypsum powder under the Rayite™ name. This composition purportedly can be cast into blocks, cured, and then machined. Industrial plasters, even those formulated with some polymer, typically have Shore D hardness above 75, and often above 80.

U.S. Publication 2003/0105202 (Stone) describes a composition of polymer-modified gypsum which has two liquid components with polymer in each component. The preferred $T_g$ range of the polymers is −20° C. to +50° C.

In the present invention, we have found that a polymer-modified gypsum in which the polymer has a $T_g$ below −23° C. gives an improved machinable medium. Furthermore, when the polymer-modified gypsum has a Shore D hardness below 70, the machinability is superior. In particular, compositions of the invention produce almost no dust, and when machined, give larger chips and shavings than other machinable media, which facilitates clean up. Cutting and milling tools can cut through the inventive medium with greater speed. The models so produced are dimensionally stable and maintain sharp, detailed edges.

A low $T_g$ of a polymer binder can be obtained by proper choice of the polymer composition or by formulation of a harder polymer with a plasticizer or by blending a hard and a soft polymer. Any method which gives an apparent polymer $T_g$<−23° C., or a measured Shore D hardness <70 for the composite material is believed to be suitable for making an improved machinable medium.

A medium which is to be milled or CNC machined for model making should have a number of physical properties. It should be soft enough to machine to well defined edges and shapes, yet strong enough to withstand the handling that the model will undergo in later steps of the prototyping process. The shavings removed during machining should be of low toxicity and large enough for easy clean up.

An additional benefit is easy application. Some machinable media are supplied in the form of modeling boards, for example, polyurethane foam. To make large models, these boards must be glued together to a size greater than the final model, then machined back, a process which is time consuming. It is preferred that a low cost foam, such as expanded polystyrene (EPS), can be crudely machined back to slightly less than the size of the final model. The foam is then overcoated with a fluid that sets or hardens to the machinable medium, and it is then machined. The final model or plug consists of an EPS core with approximately 5 to 50 mm of the medium on its surface, precisely machined to the shape of the final part. From this plug, one can cast a negative mold of the part, for example, using unsaturated polyester. The mold may be used to cast positive final parts. Such a step-wise process is commonly used in boat, automobile or aircraft production, as well as other industries.

One aspect of the invention is a composition for forming a composite material comprising a mixture of component A and component B. Component A comprises gypsum and an inhibitor and component B comprises an accelerator. Component A and/or component B further comprises a polymer binder having a $T_g$ of below −23° C.

A second aspect of the invention is a composition for forming a composite material comprising a mixture of component A and component B. Component A comprises gypsum and an inhibitor and component B comprises an accelerator. Component A and/or component B further comprises a polymer binder and a Shore D hardness of the composite material when cured is less than 70.

A third aspect of the invention is a method of forming a composite material with a polymer binder having a $T_g$ below −23° C. comprising providing a first slurry mixture of gypsum and an inhibitor and a second slurry mixture of at least an accelerator, where at least one of the first slurry mixture and the second slurry mixture comprises a polymer binder; and blending the first slurry mixture and the second slurry mixture to form a soft composite using a weight ratio of from 10:1 to 1:2.

Component A contains gypsum (calcium sulfate hemihydrate). This is a settable mineral which, when mixed with water and suitably activated, sets and cures to become an inorganic binder. Preferably, the gypsum is alpha gypsum, but beta gypsum, or blends of the alpha and beta forms, may also be used.

The gypsum used in this invention may comprise a wide variety of settable forms of calcium sulphate, which may include anhydrous calcium sulphate and/or chemical gypsum, commonly called synthetic gypsum, as well as calcium sulphate hemihydrate.

There are primarily two types of hemihydrate (CaSO$_4$*½H$_2$O) that are commercially available and conventionally referred to as the alpha and beta forms. The alpha hemihydrate is conventionally prepared by placing lump gypsum into an autoclave and calcining it at controlled superatmospheric pressure in the presence of steam. In contrast, beta hemihydrate is prepared by heating the dihydrate at atmospheric pressure in either a kettle or rotary calciner. Although the physical appearances of these two types of gypsum may be the same, they differ in the water/gypsum ratio required to produce workable products. The dissimilarity in the physical nature of the gypsum particles of the two forms arises from the differences in their respective surface properties. The larger alpha crystals have low water absorption and smaller surface area per unit weight. This translates into a lower water requirement to cause setting up, or curing, of the gypsum. The lower the weight of water in proportion to the weight of dry gypsum solids, the greater the strength of the final product after curing. The amount of gypsum used in the formulation of component A is from 50 to 80 parts, based on the total weight of component A. Preferably, 60-75 parts is used.

By itself, gypsum would set to a hard mass. This invention describes the use of a polymer binder which reduces the hardness of the set composite material, where at least one of components A and B includes a polymer binder which contains at least one copolymerized ethylenically unsaturated nonionic monomer. By "nonionic monomer" herein is meant a monomer which is electrically neutral in the pH range of 1-14. The ethylenically unsaturated nonionic monomers include, for example, (meth)acrylic ester monomers including methyl (meth)acrylate, ethyl(meth)acrylate, butyl (meth)acrylate, 2-ethylhexyl (meth)acrylate, isodecyl (meth)acrylate, lauryl (meth)acrylate, hydroxyethyl (meth)acrylate, and hydroxypropyl (meth)acrylate; (meth)acrylamide, (meth)acrylonitrile; styrene and substituted styrenes; butadiene; ethylene; vinyl acetate, vinyl butyrate and other vinyl esters; and vinyl monomers such as vinyl chloride, vinylidene chloride. Preferred are all-acrylic and styrene/acrylic polymers. Preferred is a predominantly acrylic aqueous emulsion polymer. By "predominantly acrylic" herein is meant that the polymer contains greater than 50%, by weight, copolymerized units deriving from (meth)acrylic monomers such as, for example, (meth)acrylate esters, (meth)acrylamides, (meth)acrylonitrile, and (meth)acrylic acid. The use of the term "(meth)" followed by another term such as, for example, acrylate or acrylamide, as used throughout the disclosure, refers to both acrylates or acrylamides and methacrylates and methacrylamides, respectively.

The emulsion polymer may also contain from 0% to 5%, by weight based on total monomer weight, of a copolymerized monoethylenically-unsaturated acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate.

To control the $T_g$ of the polymer, monomers used to synthesize the polymer should be properly chosen. The glass transition temperature of a polymer is the temperature at which a polymer transitions from a rigid, glassy state at temperatures below $T_g$ to a fluid or rubbery state at temperatures above $T_g$. The $T_g$ of a polymer is measured by differential scanning calorimetry (DSC) using the mid-point in the heat versus temperature transition as the $T_g$ value. The heating rate for the DSC measurement is 20° C./minute.

In the present invention, the measured $T_g$ of the polymer binder is below −23° C. Preferably, the $T_g$ is −35° C. to −60° C.

The polymer binder of components A and/or B may be emulsified or it may be in the form of a water redispersible powder. The polymer binder may also be prepared by polymerization in organic solvents or in the bulk, so long as the polymer can be dispersed or emulsified into water. While any method to prepare the polymer may work in the operation of the present invention, it may be commercially more feasible to utilize emulsified polymer binders. Emulsions formulated for the composition of the invention may contain about 35 to 65% solids, and preferably 45 to 65%, by volume. The concentration used will, of course, depend on the characteristics required in the final composite material and the speed of cure. The emulsion polymerization may be carried out by various procedures such as, for example, with all of the monomer in the reaction kettle at the beginning of the polymerization reaction, with a portion of the monomer in emulsified form present in the reaction kettle at the beginning of the polymerization reaction, with a portion of the monomer in emulsified form present in the reaction kettle, and with a small particle size emulsion polymer seed preset in the reaction kettle at the beginning of the polymerization reaction. The polymerization process may be conducted as a batch, semicontinuous, or continuous process. Specific emulsion polymerization techniques that may be employed in this invention include, for example, U.S. Pat. Nos. 4,325,856, 4,654,397, and 4,814,373.

Other suitable methods of reducing the apparent $T_g$ of a harder polymer are known to those skilled in the art and are envisioned by the inventors. For example, cosolvents can be included in the formulation. These cosolvents, also called plasticizers, cause the polymer to behave like a much softer polymer than one would expect from the polymer composition. One example of a plasticizer is dioctyl phthalate, but many others are known. Another method of reducing the apparent $T_g$ of a polymer is to blend a very soft polymer with a harder polymer. These hard and soft polymers can have similar monomer compositions but differ in molecular weight, or their monomer compositions may differ. When blends of materials are employed, all of the materials can be included in one component of the invention, or they can be divided among the A and B components of the invention.

One suitable polymer binder is Rhoplex™ 1950 Emulsion sold by the Rohm and Haas Co., Philadelphia, Pa. This all-acrylic emulsion has 63% polymer solids by weight and a calculated $T_g$ of −50° C. (calculated using the Fox equation).

Component A also includes an inhibitor, or more specifically, a gypsum hydration inhibitor. This allows the unset calcium sulfate hemihydrate to be stored in an aqueous slurry form until immediately before use, when an activator, such as aluminum sulfate, may be added to initiate the gypsum setting. The hydration inhibitor is a polymer or copolymer of a polycarboxylic acid. Some known hydration inhibitors include animal proteins (U.S. Pat. No. 4,661,161), polyphosphates (U.S. Pat. No. 5,746,822) and polycarboxylates (U.S. Pat. No. 4,157,264 and also U.S. Publication 2003/0105202). One suitable hydration inhibitor is Tamol™ 963 35% dispersant, sold by the Rohm and Haas Co., Philadelphia, Pa. The polymeric inhibitor may conveniently be in the form of a sodium or ammonium salt.

Component B includes an accelerator, or more specifically, a hydration set accelerator. The amount of accelerator required will be based on the amount of alpha gypsum and hydration inhibitor present in the composition. The accelerator will preferably be added in an amount of from 0.1 to 6.0 weight percent, and more preferably from 0.1 to 4.0 weight percent, based on the weight of the solids content of component B. Suitable accelerators include metallic salts which can provide acidic cations. Preferable metallic salts are aluminum sulfate, calcium sulfate, ferric sulfate, zinc sulfate and ferric chloride. The most preferred accelerator for this composition is aluminum sulfate.

Many other optional additives can be included in component A or B or both. These are well known to modify properties of either the liquid component or of the final composite material. Among these additives are:

Surfactants, and in particular, nonionic surfactants, to stabilize aqueous suspension or emulsion of polymer and other additives.

Defoamers, such as polysiloxanes, to minimize foam during mixing or application.

A pH adjuster. One suitable pH adjuster for component A is calcium hydroxide, as described in EP1403227.

Extenders. Among suitable extenders are sand and silica, alumina trihydrate (ATH), terra alba, fly ash and light weight extenders such perlite or hollow glass spheres Thickeners such as alkali soluble resins (ASRs), hydrophobically modified urethane resins (HEURs), hydroxy ethyl cellulose, attapulgite or bentonite clays, and others. Many of these are known to gypsum and also to paint formulators.

Other additives such as colorants, wetting aids, and water repellant waxes.

In one embodiment, component A comprises 60-75 weight % gypsum, 0.1-3 weight % inhibitor, 10-30 weight % polymer binder, and 0-14.9 weight % component A additives; and component B comprises 5-50 weight % polymer binder, 1-15 weight % accelerator, and 35-94 weight % component B additives. The $T_g$ of the polymer binders is below $-23°$ C. Component A additives may include a defoamer, a surfactant, a pH adjuster, and combinations thereof; and component B additives may include an extender, a defoamer, a surfactant, a thickener, an activator, and combinations thereof.

Preferably, component A and B are both aqueous slurries. At the point of use, components A and B are combined and mixed, shaped into the machinable form and allowed to set. The composite material may be applied by casting, troweling or spraying, or other known means.

The Shore D hardness of the composite material is less than 70. Preferably, the Shore D hardness of the composite material is 50-70.

COMPARATIVE EXAMPLE 1

Castonite™ MM Mining Membrane is sold by Rohm and Haas Company. This material can be mixed and cast into blocks, or can be mixed and applied over EPS. After curing at ambient temperature, the medium has a Shore D hardness of 75. It can be carved with a sharp utility knife or drilled with a standard drill bit, leaving shavings of 0.2 mm average size. The carved or drilled edge is sharp and well defined.

COMPARATIVE EXAMPLE 2

Rayite™ 100 is a machinable medium sold by United States Gypsum Co. (Chicago, Ill.). It is a powder to be mixed with water and cast into machinable forms. When a block was prepared, cast and dried at ambient temperature, it had a Shore D of 77. It can be carved with a sharp utility knife or drilled with a standard drill bit, leaving shavings of 0.5 mm average size.

EXAMPLE

Legend: Ingredients Used in the Examples Below.

| | |
|---|---|
| Polymer Binder: | Rhoplex ™ 1950 Emulsion; Rohm and Haas Co. |
| Defoamer: | BYK ®-024; BYK Chemie |
| Surfactant: | Triton ™ X405; Dow Chemical Co. |
| Hydration Inhibitor: | Tamol ™ 963 35% Dispersant; Rohm and Haas Co. |
| Latex binder | Rhoplex ™ HA16 Emulsion; Rohm and Haas Co. |
| Activator: | Aluminum sulfate octadecahydrate (50% in water) |
| Gypsum: | Alpha hemi-hydrate |
| Attapulgite Thickener | Attagel ® 50; Englehard Corp. |
| Cellulosic Thickener | Natrosol ® 250 HHR; Hercules Inc. |
| ATH | Alumina Trihydrate, Moldex ™ A120; J.M.Huber) |

Composition of Component A According to the Invention:

| | |
|---|---|
| Rhoplex ™ 1950 | 24.5 |
| BYK ™ 024 | 0.3 |
| Triton ™ X405 | 0.52 |
| Tamol ™ 963, 35% | 0.56 |
| Water | 4.5 |
| Yellow pigment | 0.1 |
| Calcium Hydroxide | 0.1 |
| Attagel ™ 50 | 0.2 |
| alpha Gypsum | 69.22 |
| TOTAL | 100 |

Composition of Component B According to the Invention:

| | |
|---|---|
| Rhoplex ™ HA16 | 26.14 |
| BYK ™ 024 | 0.3 |
| Triton ™ X405 | 0.49 |
| Water | 4.41 |
| Natrosol 250 HHR | 0.06 |
| Blue pigment | 0.1 |
| Al Sulfate 50% | 3.2 |
| ATH | 65.3 |
| TOTAL | 100 |

Physical Properties of Components A and B:

| | Component A | Component B | Units |
|---|---|---|---|
| pH | 8.5 | 3.7 | |
| viscosity | 73000 | 56000 | cPoise |
| density | 1.75 | 1.68 | g/cc |

When component A and B are mixed in a 100:48 ratio by weight (100:50 by volume), they set in approximately 6 minutes. Linear expansion upon setting is approx 0.2%. After curing and drying at ambient temperature, Shore D is 60. When carved with a sharp utility knife or drilled with a standard drill bit, the shavings are 5-10 mm in size with no dust. It carves with lesser knife pressure that the comparative examples. With moderate drilling pressure, the drill bores through the inventive example approximately twice as quickly as it goes through the comparative examples.

The invention claimed is:

1. A composition for forming a composite material comprising a mixture of component A and component B,
   component A comprising:
     gypsum; and
     an inhibitor; and
   component B comprising:
     an accelerator;
   wherein at least one of component A and component B further comprises a predominantly acrylic aqueous emulsion polymer binder having a $T_g$ of below $-23°$ C.

2. The composition of claim 1 wherein component A further comprises:
   a defoamer;
   a surfactant; and
   a pH adjuster.

3. The composition of claim 1 wherein component B further comprises:
   an extender;
   a defoamer;
   a surfactant;
   a thickener; and
   an activator.

4. The composition of claim 1 wherein component A comprises 60-75 weight % gypsum based on a total weight of the component A.

5. The composition of claim 1 wherein
   component A comprises:
     60-75 weight % gypsum;
     0.1-3 weight % inhibitor;
     10-30% polymer binder; and
     0-14.9 weight % component A additives selected from the group consisting of a defoamer, a surfactant, a pH adjuster, and combinations thereof; and
   component B comprises:
     5-50 weight % polymer binder;
     1-15 weight % accelerator; and
     35-94 weight % component B additives selected from the group consisting of an extender, a defoamer, a surfactant, a thickener, an activator, and combinations thereof.

6. The composition of claim 1 further comprising a colorant.

7. The composition of claim 1 wherein the gypsum comprises calcium sulfate hemihydrate, the inhibitor comprises aqueous polycarboxylate, the polymer binder comprises an acrylic copolymer, and the accelerator comprises aluminum sulfate.

8. The composition of claim 2 wherein the defoamer comprises a polysiloxane, the surfactant comprises a nonionic surfactant, and the pH adjuster comprises calcium hydroxide.

9. The composition of claim 3 wherein the polymeric binder comprises an acrylic copolymer, the extender comprises alumina trihydrate, the defoamer comprises polysiloxane, the surfactant comprises a nonionic surfactant, the thickener comprises hydroxyethyl cellulose, and the activator comprise aluminum sulfate.

10. A composition for forming a composite material comprising a mixture of component A and component B,
    component A comprising:
      gypsum; and
      an inhibitor; and
    component B comprising:
      an accelerator;
    wherein at least one of component A and component B further comprises a polymer binder and wherein a Shore D hardness of the composite material when cured is less than 70.

11. The composition of claim 10 wherein component A further comprises:
    a defoamer;
    a surfactant; and
    a pH adjuster; and
    component B further comprises:
      an extender;
      a defoamer;
      a surfactant;
      a thickener; and
      an activator.

12. The composition of claim 10 wherein the Shore D hardness is 50-70.

13. A method of forming a composite material with a polymer binder having a $T_g$ below $-23°$ C. comprising:
    providing a first slurry mixture of gypsum and an inhibitor and a second slurry mixture of at least an accelerator, at least one of the first slurry mixture and the second slurry mixture comprising a predominantly acrylic aqueous emulsion polymer binder; and
    blending the first slurry mixture and the second slurry mixture to form a soft composite using a weight ration of from 10:1 to 1:2.

14. The method of claim 13 further comprising: mixing the soft composite with a hard composite material.

15. The composition of claim 1 wherein the polymeric binder is has a Tg of $-35°$ C. to $-60°$ C.

16. The composition of claim 1 wherein the predominantly acrylic aqueous emulsion polymer is a styrene/acrylic polymer.

17. The composition of claim 1 wherein the predominantly acrylic aqueous emulsion polymer is an all-acrylic polymer.

18. The composition of claim 1 wherein the composite material exhibits a Shore D hardness of about 50 to about 60.

19. A composition for forming a composite material comprising a mixture of component A and component B, wherein
    component A comprises:
      60-75 weight % gypsum;
      0.1-3 weight % inhibitor;
      10-30% polymer binder; and
      0-14.9 weight % component A additives selected from the group consisting of a defoamer, a surfactant, a pH adjuster, and combinations thereof; and
    component B comprises:
      5-50 weight % polymer binder;
      1-15 weight % accelerator; and
      35-94 weight % component B additives selected from the group consisting of an extender, a defoamer, a surfactant, a thickener, an activator, and combinations thereof;

wherein the polymeric binder of at least one of component A and component B is a predominantly acrylic aqueous emulsion polymer having a $T_g$ of below $-23°$ C., wherein the polymer comprises greater than 50%, by weight, of copolymerized units deriving from (meth) acrylic comonomers selected from the group consisting of (meth)acrylate esters, (meth)acrylamides, meth)acrylonitrile), (meth)acrylic acid, and combinations thereof; and wherein the composite material exhibits a Shore D hardness when cured of less than 70.

20. The composition of claim 19, wherein the polymer binder of component A has a $T_g$ of $-35°$ C. to $-60°$ C., is an all-crylic or styrene/acrylic polymer, and wherein the composite material exhibits a Shore D hardness when cured of about 50 to about 60.

* * * * *

UNITED STATES PATENT AND TRADEMARK OFFICE
CERTIFICATE OF CORRECTION

PATENT NO. : 7,637,995 B2  Page 1 of 1
APPLICATION NO. : 11/211223
DATED : December 29, 2009
INVENTOR(S) : Bowe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Ninth Day of November, 2010

David J. Kappos
*Director of the United States Patent and Trademark Office*